(12) United States Patent
Berger et al.

(10) Patent No.: US 8,754,765 B2
(45) Date of Patent: Jun. 17, 2014

(54) NOTIFYING A USER OF AN AVAILABLE MEDIA OBJECT

(75) Inventors: Adam L. Berger, Pittsburgh, PA (US); Gary N. Wallace, Jr., Butler, PA (US); Michael J. Wener, Munising, MI (US)

(73) Assignee: Penthera Partners, Inc., Pittsburgh, PA (US)

( * ) Notice: Subject to any disclaimer, the term of this patent is extended or adjusted under 35 U.S.C. 154(b) by 977 days.

(21) Appl. No.: 12/609,515

(22) Filed: Oct. 30, 2009

(65) Prior Publication Data

US 2010/0109868 A1 May 6, 2010

Related U.S. Application Data

(60) Provisional application No. 61/111,502, filed on Nov. 5, 2008.

(51) Int. Cl.
*G08B 1/08* (2006.01)

(52) U.S. Cl.
USPC ............... 340/539.11; 340/539.1; 340/540; 340/573.1; 455/406; 455/414.2; 455/566

(58) Field of Classification Search
USPC ......... 340/540, 539.1, 539.11, 573.1, 825.69, 340/825.72; 455/406, 414.2, 566, 566.1, 455/564, 565, 456.1, 456.2, 456.3; 709/201, 231
See application file for complete search history.

(56) References Cited

U.S. PATENT DOCUMENTS

| | | | |
|---|---|---|---|
| 7,657,920 B2 * | 2/2010 | Arseneau et al. ............. 725/133 |
| 2004/0103032 A1 | 5/2004 | Maggio |
| 2004/0266529 A1 | 12/2004 | Chatani |
| 2007/0207795 A1 | 9/2007 | Roundtree |
| 2007/0276721 A1 * | 11/2007 | Jackson ........................ 705/10 |
| 2008/0160956 A1 | 7/2008 | Jackson et al. |
| 2008/0176543 A1 * | 7/2008 | Gravel et al. .............. 455/414.2 |
| 2009/0112713 A1 * | 4/2009 | Jung et al. ..................... 705/14 |
| 2009/0259711 A1 * | 10/2009 | Drieu et al. ................... 709/201 |
| 2010/0109868 A1 | 5/2010 | Berger et al. |

FOREIGN PATENT DOCUMENTS

| | | |
|---|---|---|
| CN | 102203762 A | 9/2011 |
| EP | 2356575 | 8/2011 |
| WO | WO 2010/053856 | 5/2010 |

OTHER PUBLICATIONS

European Communication from European application No. 09825273.7 mailed Jul. 5, 2011 (2 pages).
Response to European Communication issued Jul. 5, 2011 from European application No. 09825273.7 filed Dec. 30, 2011 (8 pages).
International search report and written opinion from corresponding PCT application No. PCT/US2009/62933 mailed Feb. 2, 2010 (7 pages).
Apache, The Apache HTTP Server Project, Internet website address: http://httpd.apache.org/, Feb. 17, 2010 (2 pages).
Chinese Office Action in Chinese Application No. 200980144327.3 issued Feb. 4, 2013 (5 pages).

* cited by examiner

*Primary Examiner* — Hung T. Nguyen
(74) *Attorney, Agent, or Firm* — Fish & Richardson P.C.

(57) ABSTRACT

Among other features, notification is presented on a mobile device to a user to advise the user of the availability of a media object that (a) has been received from a server and stored on the mobile device without the user having been aware of the receipt or storage, or (b) has newly become available for streaming from the server to the mobile device.

31 Claims, 8 Drawing Sheets

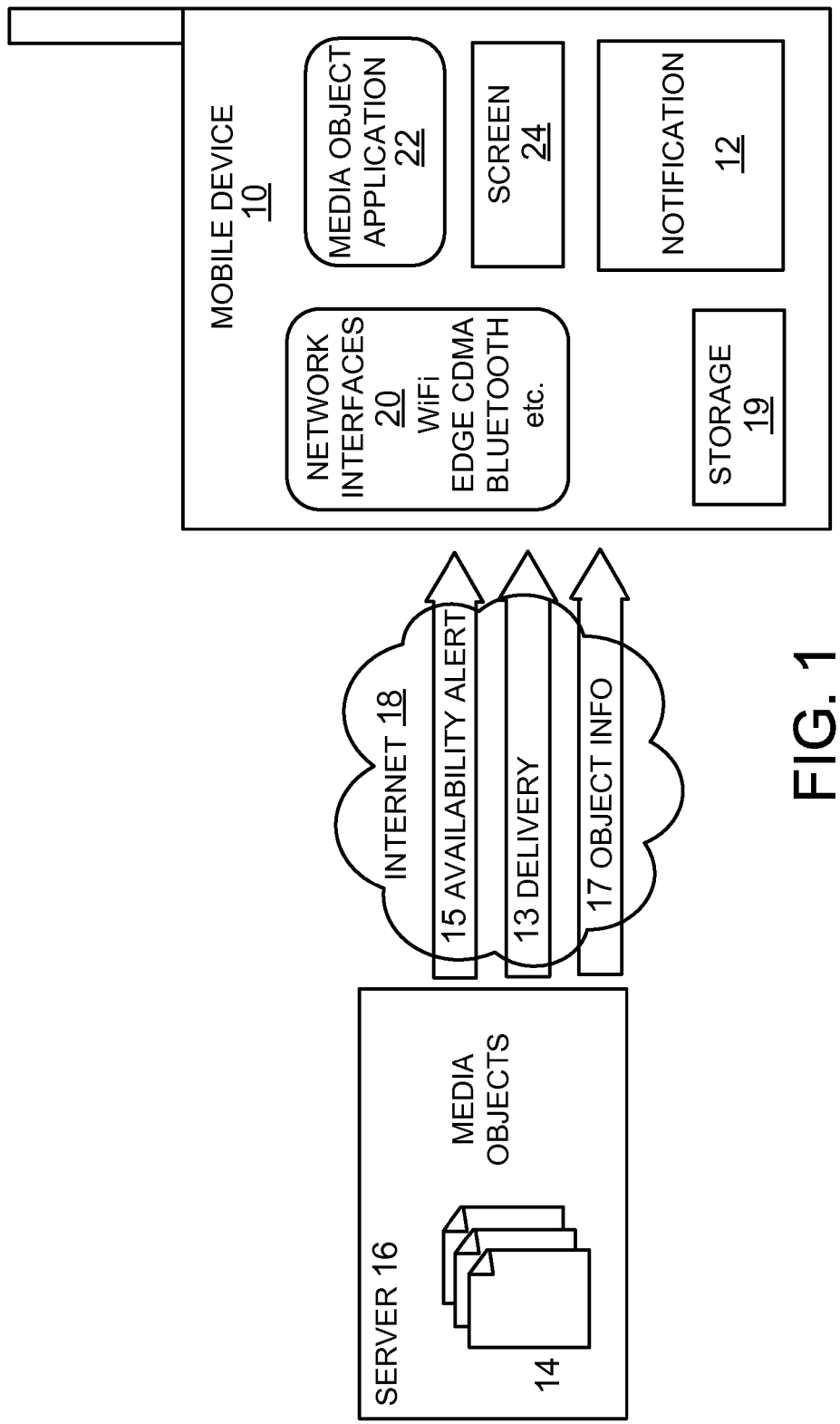

NOTIFYING A USER OF AN AVAILABLE MEDIA OBJECT

This application is entitled to the benefit of the priority of U.S. provisional application Ser. No. 61/111,502, filed Nov. 5, 2008, and incorporated here by reference.

This description relates to notifying a user of an available media object.

BACKGROUND

A media object (such as a song, image, video, or other multimedia object), stored on a server and optimized for later playing on a mobile device can be delivered to the mobile device proactively or reactively. In proactive delivery, the media object is delivered to and stored on the mobile device ahead of when the user attempts to access it. In reactive delivery, the media object is held on the server until it is requested by user, and then streamed to the mobile device and played immediately.

SUMMARY

In general, in an aspect, at a mobile device, (a) a media object to be played to a user of a mobile device is received from a server and stored on the mobile device, without requiring a user of the mobile device to be aware of the receipt or storage, or (b) an alert that a media object has become available for streaming delivery to and playing to the user at the mobile device is received at the mobile device, or both (a) and (b). A notification is presented on the mobile device to the user indicating that the media object is available to be played.

Implementations may include one or more of the following features. The notification is presented modally. The notification is displayed. The notification includes vibrating the mobile device or playing a sound. The notification includes interactive controls that can be invoked by the user. The notification includes information that describes the media object. The user can preselect a form of the notification to be presented. The user selects a feature of the notification to be presented. The user is enabled to select types of the media object for which the notification is to be presented. The notification indicates that the media object is not to be played until a time later than when it is first available. The notification indicates that the media object is not to be played after an expiration time. The notification incorporates other notifications related to other media objects at the same time. The receiving of the media object at the mobile device occurs automatically without an action by the user. The user can select from a displayed list of available media objects a media object to be played. The notification includes presenting advertising to the user.

In general, in an aspect, notification is presented on a mobile device to a user to advise the user of the availability of a media object that (a) has been received from a server and stored on the mobile device without the user having been aware of the receipt or storage, or (b) has newly become available for streaming from the server to the mobile device.

These and other features and aspects, and combinations may also be expressed as methods, business methods, apparatus, systems, program products, databases, means for performing functions, and in other ways.

Other advantages and features will become apparent from the following description and from the claims.

DESCRIPTION OF THE DRAWINGS

FIGS. 1 and 2 are block diagrams.

DESCRIPTION OF THE INVENTION

Figure 1A:
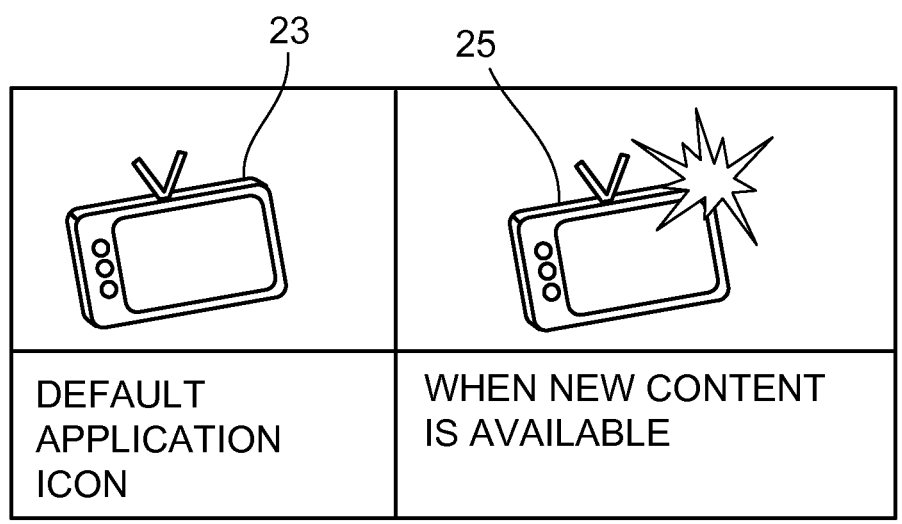
FIGS. 1A, 1B, 4, 5, and 6 are screen shots

Referring to FIG. 1, a mobile device 10 can be arranged to present a notification 12 to a user when a media object 14 is available to be played. The media object may have become available for playing on the mobile device because a server 16 where it is stored has sent an availability alert 15 to tell the mobile device that the object is available to be streamed to the mobile device for playing reactively whenever the user asks for the media object. Or the media object may have become available for playing on the mobile device by having been proactively delivered 13 to the mobile device and stored there until the user wants the media object to be played. Other delivery techniques could also be used.

In our use of the term mobile device, we include (without limitation) personal digital assistants, cellular telephones, notebook computers, and any other device that is portable and can communicate through an available (typically wireless) communication channel. In our use of the term media object, we include (without limitation) music, images, videos, cartoons, advertisements, text documents, other multimedia objects, and any other object that can be presented to, played for, or performed for a user of the device using audio, video, display, or other technologies. In our use of the term play and the term present, we include (without limitation) performing, playing audibly or visually or both, displaying, or in any way presenting to a user's senses.

The notification 12 can be presented by the mobile device 10 in a wide variety of ways, and at a wide variety of times. For example, the notification can be presented audibly or visually or both, through a display screen 24, speakers, earphones, vibration, or any combination of them. The notification can be generated at the mobile device for presentation to the user based on information 17 about the media object that is provided from the server 16 (for example, as part of or related to the availability alert) or from other sources. The notification can be generated at the server, delivered to the mobile device, and used by the mobile device as is (or with modification) in the presentation of the notification to the user. The notification can be presented to the user in any form and through any presentation medium, for example, by email or a text message, on screen, embedded in other objects being presented, or in other ways.

The notification 12 can be presented at a variety of times, and more than one time, either alone or in combination with other notifications related to other media objects. The notification can be presented immediately or promptly when the availability alert is received or when the object is proactively delivered to the mobile device. Prompt presentation is especially useful for a time-sensitive media object 14 such as a breaking news program or a financial market update. In some cases, the notifications can be delayed and presented at later times, either at regular times specified by the user, or at times determined by the system. Notifications can be delayed until several notifications are ready for presentation. The availability alert or the proactively delivered object can contain or be accompanied by information about when the notification is to be presented, which may be at a later time. The mobile device could respect such information or ignore it or some combination of the two.

In some embodiments, the media objects 14 are locked by encryption and/or subjected to digital rights management (DRM) control prior to delivery to the mobile device. The DRM control can include not permitting the media object 14 to be played until after a certain amount of time has passed or beginning at a specific time. The availability alert or the object information or the object itself can contain information about the time when the object is allowed to be played. DRM control can include setting a time after which playing of the object is no longer permitted. A notification can be generated when the expiration time is approaching or imminent. DRM control can also be used to control the circumstances under which (or conditions required before) a media object can be presented. The notification can alert the user about such circumstances or conditions.

Among the advantages of the presentation of notifications is that, especially in the case of proactive delivery, the delivery can be accomplished in the background, without bothering the user, and the user will anticipate having the notification presented once the full media object has arrived. Also, suppliers of media objects can control the times and conditions under which the media is allowed to be played.

The presentation of the notification 12 can be modal, requiring the user to click through the notification before being allowed to use any other function of the mobile device, e.g., to play a media object. If more than one media object 14 is available at a given time or another media object becomes available when a notification 12 is already being presented, the notifications can be stacked up to allow or require the user to click through the stacked notifications before invoking any other functions.

In some examples, presentation of a new notification could cause an old one being to disappear, so that there is only one notification being presented at any given time. In some embodiments, the presented notification 12 automatically disappears from the screen 24, for example, after a certain amount of time.

Among other advantages, the modal presentation can increase the chances that the user will review a notification including any advertisement or other promotional material that is part of the notification. The forced review may also increase the chances that the user will ask for presentation of the media object which may also contain advertising. This increased chance of review of the notification or presentation of the media object in turn may increase the willingness of advertisers to buy advertising and or the price that an advertiser will pay.

The notification 12 can take various forms. For example, the notification 12 can be visual, e.g., an icon on the screen 24, or a visible change to an existing and standard icon (e.g., as shown in FIG. 1A, a change from a default application icon 23 to another version of the icon 25), an LED light that flashes (or remains on), a text message, or graphics, e.g., a logo corresponding to the new media, vibration of the device, or many others. The notification 12 can be audible and contain an audio, e.g., a chirp or other sound selectable by the user.

A wide variety and amount of information can be presented in the notification 12. The information can include information about the media object 14, e.g., the name, title, duration, source, time of availability, cost, advertising, and thumbnail images. The notification 12 can also a wide variety of buttons, links, and other devices that enable the user to take an action with respect to the notification. One action would be to ask for the presentation of the media object to begin immediately. Another could be to ask for the notification to be presented at a future time or times, or to never to be presented again. The user could be asked to confirm payment for the presentation of the media object.

In some implementations, the user can select types or sizes, or media of media objects, (e.g., news, sports, finance, and others; videos but not audio items; large files but not small ones), for which he/she would like to receive a notification.

The user can also select the form, timing, and features of the notification 12. For example, the user can toggle the audible feature on or off, specify which sound (and at what volume) to associate with the notification. In some embodiments, the sound can be suppressed when the mobile device is configured in "vibrate" or "silent" mode.

Figure 1B:
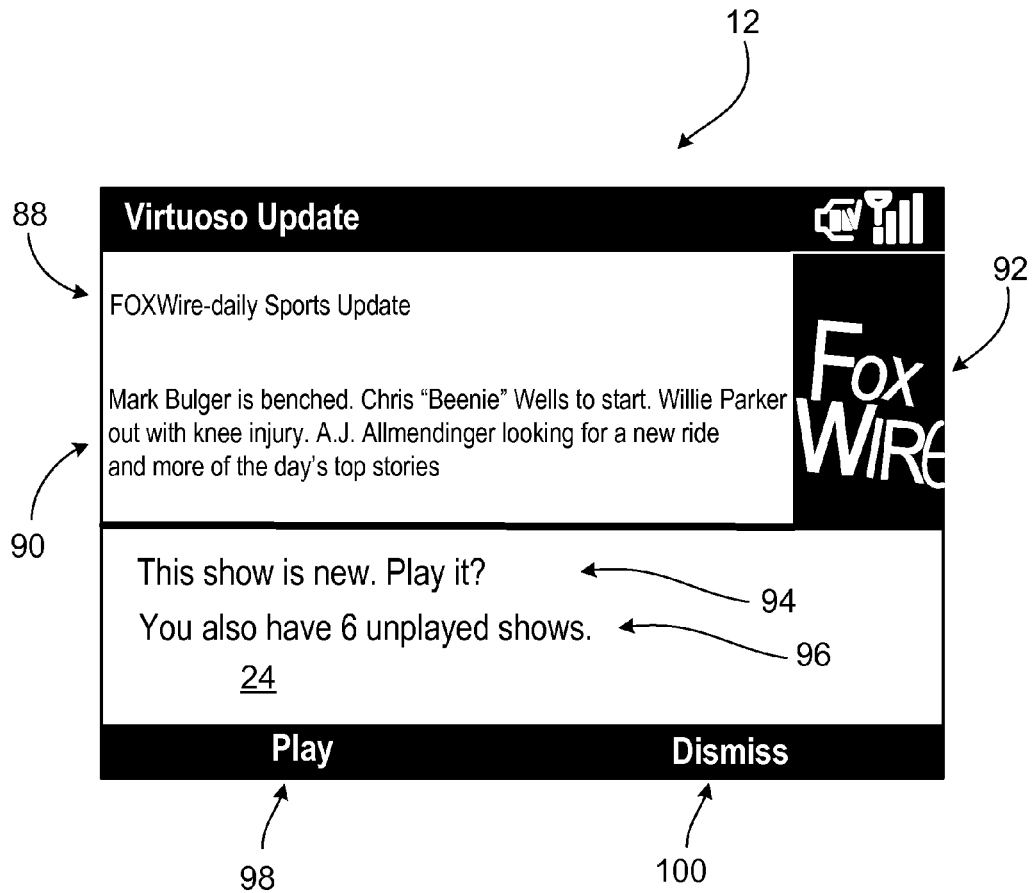

In the example shown in FIG. 1B, a modal notification 12 about sports news includes a title 88 that identifies an overall source and category of the media object associated with the notification 12, a text description 90 of the media object, and a logo 92 associated with the distributor or source of the news. The notification 12 also includes a text message 94 indicating that the sports news is new (for example, not previously available to this user on this device) and another text message 96 reminding the user of the number of un-played available media objects. The user can dismiss the notification 100 by clicking the dismiss button or request playing of the sports news by clicking on the play button.

Each media object 14 can be episodic, e.g., with new editions published at regular intervals, or be part of a sequence, e.g., a movie, or can be a stand alone item. A media object 14 may be time sensitive and require immediate playing (e.g., a stock ticker update). Other media objects may be relatively time insensitive, and a delay of hours in delivery and presentation can be acceptable (e.g., a movie trailer).

The delivery of the media objects 14 is facilitated by one or more network interfaces 20 (FIG. 1) of the mobile device 10, e.g., GPRS/EDGE, CDMA/EVDO, WiFi, Bluetooth, or a USB cable tethered to a host computer. Each of the network interfaces can take the advantage of a network resource for connecting to a communication network 18 (e.g., the Internet or other communication network). This connection may be the last hop for the media object to traverse in its travel from the server 16 to the mobile device 10. The availability of network resources may vary from time to time as, for example, the mobile device moves in and out of network hotspots. For example, at one moment, WiFi and EDGE may be available; a few minutes later, only EDGE may be available.

The mobile device includes a media object application 22 that provides a wide variety of functions including communication with the server with respect to media objects, receipt of media objects in proactive or reactive modes, receipt and processing of availability alerts and object information from the server, assembly, generation, and presentation of notifications, interaction with the user in connection with presented notifications, reporting to the server which notifications have been presented, when, and with what result, management of user preferences regarding notifications, playing of media objects, management of DRM controls and decryption, tracking of the intended timing and frequency of presentation of notifications, and others.

The proactively delivered media objects 14 can be stored on a storage device 19 (e.g., a flash memory or magnetic disk drive) of the device as locally-stored media objects. The storage of a copy of a media object 14 on both the server 16 and the mobile device can be sync'ed.

In some implementations, proactive delivery of a media object that is to be locally stored happens automatically without user action, for example, without the user needed to press a key or attach a cable. The automatic proactive delivery can take place when the mobile device 10 is on, regardless of its state: plugged in and charging, engaged in other activities (e.g., a phone call), or in a power-save mode when the screen 24 is blank.

Figure 2:
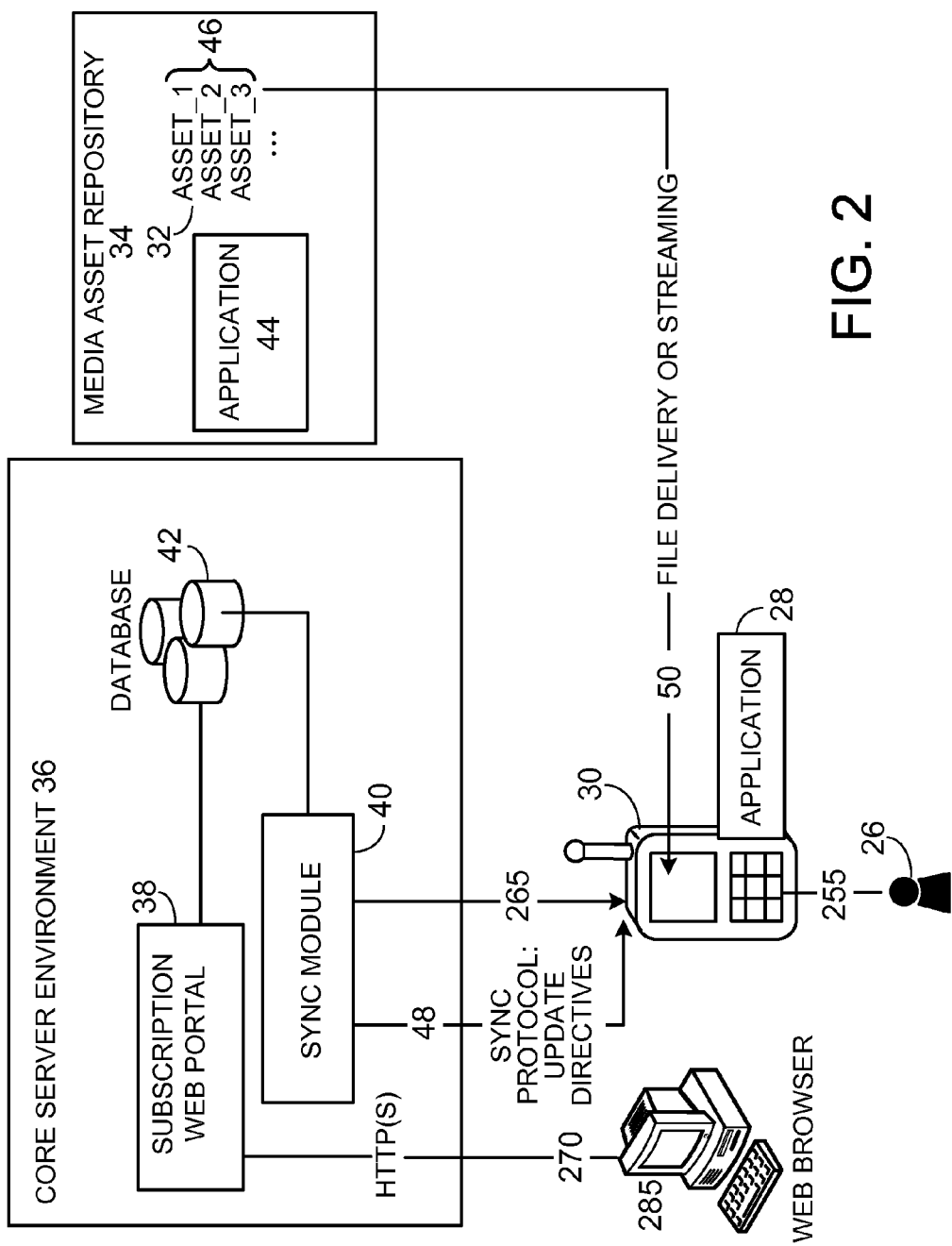

As shown in FIG. 2, the media object application 28 on the mobile device 30 communicates with a core environment running on the server 36 to receive each media object 32 (either by streaming or bulk downloading and storage on the mobile device) from a media asset repository 34 (which may or may not be located at the same place as the server) for playing by a user 26. The core server environment 36 performs a wide variety of functions in connection with distributing the media objects and information for use in the presentation of notifications. These functions can include managing registration and subscription information for individual users as obtained through the web portal and a web browser on user computers, accumulating and providing availability alerts to the mobile device, accumulating and providing other information about media objects to the mobile device (including timing, restrictions, descriptions, and summaries), interacting with the mobile device and the user of the mobile device, managing DRM control of the use of media objects, and others.

Software components of the core server environment for performing these and other functions may include a web portal 38, a sync module 40, and a database 42. The media asset repository 34 includes an object system 46 storing the media objects 32 for subsequent delivery to the mobile device 30, and an application 44 managing the delivery of those objects 32 over, e.g., an IP network to the mobile device. An example of the application 44 is an Apache HTTP server as described on the Apache website at http://httpd.apache.org/. The application 28 can be installed by the mobile device manufacturer (OEM) before the mobile device 30 is sold to the user 26, or by the user 26 after acquiring the device by, for example, downloading the application 28 through the Internet from the core server environment.

The application 28 is configured to automatically implement one or more of the following sequential applications (or a wide variety of other sequences):

1) Wait for a signal to indicate that sync'ing should occur. The signal may come from the mobile device 30, from the server 36, or from the user 26.

2) Select an available IP channel (GPRS, WiFi, HSDPA, USB port) for the sync'ing.

3) Connect to the sync module 40 on the server 36 and transmit a query 48 that conforms to a defined communication protocol and asks for newly available media objects. The query may be to ask the server for information about newly available media items. In response to the query, the sync module may look in the database to identify newly available media objects. For instance, the sync module may search for newly available episodes for a user who has subscribed to Baseball Tonight.

4) Receive new media objects 50 from the media asset repository 34 and treat any locally stored version of the media object as expired.

5) Optionally, report (in conformity with the sync'ing protocol) the delivery event and the usage of the media object back to the server 36.

The application 28 can perform the steps 1)-5) automatically without the need for the user's awareness of the steps being performed or the users action to intervene, activate, or adjust the performance of the steps. Newly available media objects can be delivered proactively hourly, daily, or weekly to the mobile device 30 (e.g., in the background) without the requirement for any user action. The media objects 46 in the media asset repository can also be made reactively available to the user 26. The user can be notified when the proactive delivery is completed or the reactive delivery is available as described in FIG. 1 and take further actions based on the notification, for example, reviewing the media objects delivered or to be delivered, selecting media objects of interest, or playing the selected media objects.

The user can access the locally stored media objects manually. In some examples, an easy manual access is provided by a file system on the mobile device 30 that stores the proactively delivered media objects 32. For example, when the mobile device 30 is a Windows Mobile device, the files can be stored in the "My Documents" folder. A notified user can access the stored media objects by, for example, use of existing tools on the mobile device (e.g., a "File Manager" application on a Windows Mobile device).

Figure 3:
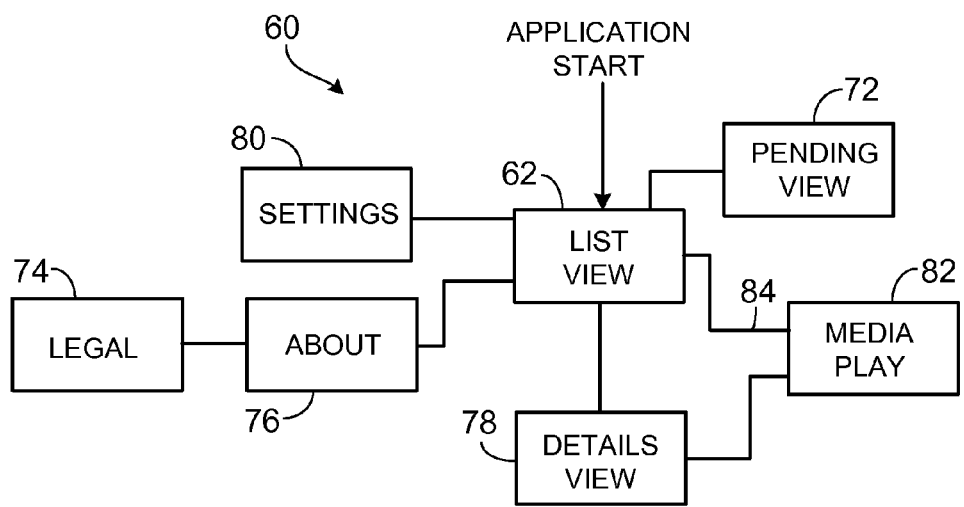
FIG. 3 is a flow diagram. .

In some embodiments, whether or not notifications have been presented, the user can access the locally stored media object using the application 28 as shown in FIG. 3. The application 60 provides the notified user 26 a list 62 of the locally-stored media objects and/or a list 72 of the remotely-stored media objects and allows the user to access the listed media objects easily, for example, by a simple click. The user-friendly access may be useful, for example, when a file system described above is not available (e.g., on a Java-based mobile device) or the manual access to the file system is non-intuitive.

Figure 4:
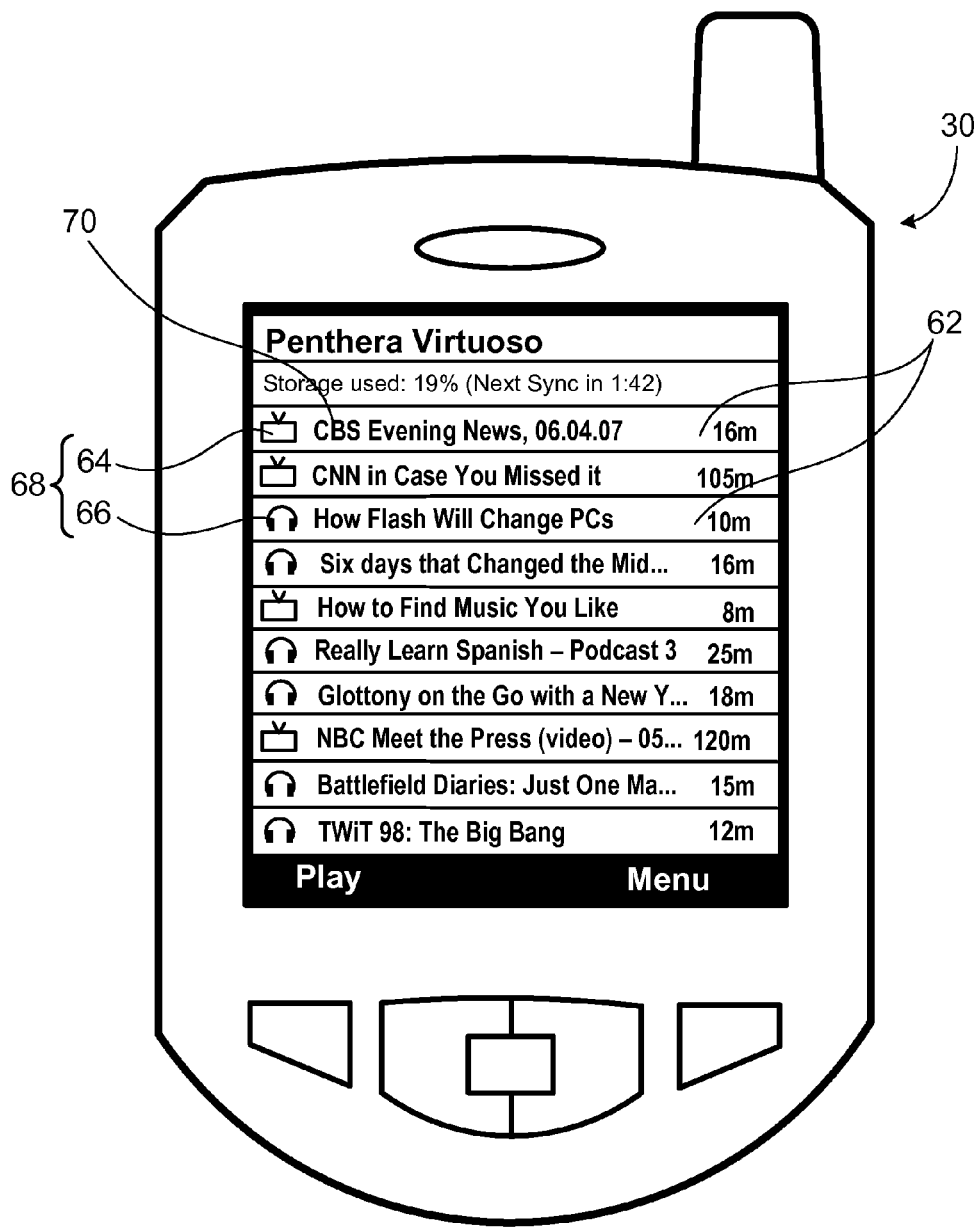

The list 62 contains information, such as legal information 74 (e.g., copyrights that apply to the media objects), or other information 76 (e.g., content) about the available proactively delivered media objects. In the example shown in FIG. 4, the list 62 displayed includes, for each media object, an icon 68 indicating a feature, e.g., the media object is visual as indicated by a visual icon 64 or the media object is audible as indicated by an audio icon 66, of the media object 70. The content of the media objects 70 can also be identified in text. The duration of each media object 70 may also be displayed.

Referring again to FIG. 3, the user can also obtain a detailed view 78 of a particular media object listed on the list 62 when detailed information is requested by, for example, identifying the media object of interest. The pending list 72 of the application 60 provides to the user a view of the media objects that are scheduled for delivery and/or in transit but not yet fully downloaded. The list 72 can have a similar view or content to that of the list 62 exemplified in FIG. 4.

Figure 5:
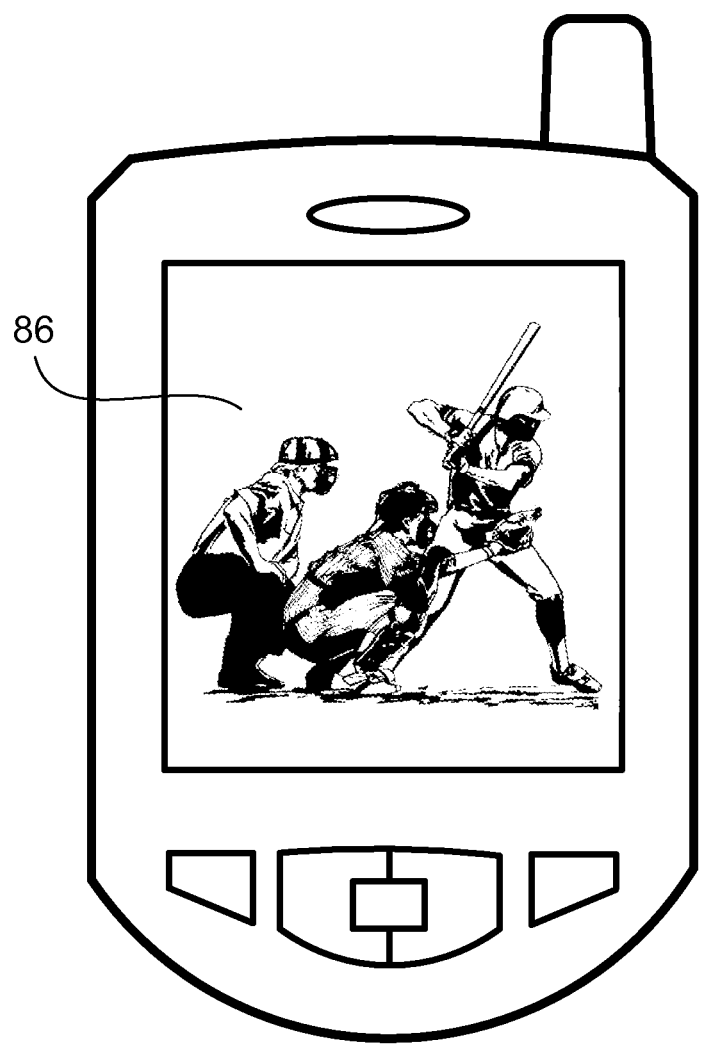

In the example shown in FIG. 3, the application 60 also provides a user-interactive interface 80 to allow the user to change some aspects or settings of the application 60. For example, the user can select or change the format and/or content of the lists 62 and 72, e.g., sequence of the listing, number of lists to display on each page, and others. The application 60 can include a built-in mechanism that plays or presents the content of the media object when the user selects one from the list. The application 60 can also interact with other applications 82 (e.g., web browser, media player, and others) within the application 28 (FIG. 2) on the mobile device 30, using application programming interface (API) calls 84. When the user selects a media object of interest from the list 62 (or from the file system using a native file browser), an appropriate application external to the application 60 is launched to render the locally stored or remotely stored media, for example, baseball live show 86 of FIG. 5.

Figure 6:
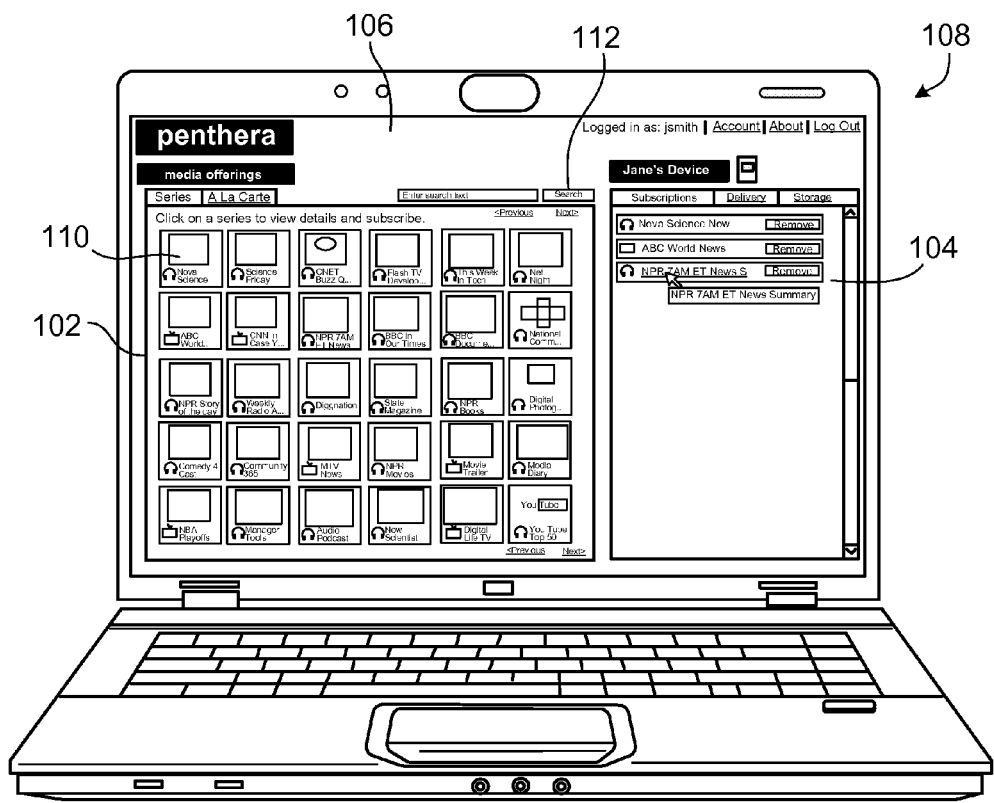

Referring to FIG. 6, the application 60 of FIG. 3 can also be presented using user-friendly application icons 102 and 104 on a user interface 106 of a mobile device 108 (particularly when the user interface 106 is sufficiently large, such as a screen of computer) to the user so that the user can easily use the application. For example, the media objects from different sources are categorized and each category 110 is listed graphically with more description than in the sample list 62 of FIG. 4. The application 60 also provides a search function 112 on the user interface 106 to facilitate the user selection of the media objects of interest.

Other implementations are also within the scope of the following claims.

What is claimed is:

1. A method comprising:
at a mobile device, receiving at successive times from a server and storing on the mobile device, without requiring a user of the mobile device to be aware of the receipt or storage, media objects for playing to the user on the mobile device,
for each of at least some of the media objects, when the media object has been received and stored, presenting a notification on the mobile device indicating that the media object is available to be played, the notification being distinct from the media object, the notification being presented modally to the user, the notification being presented without necessarily presenting the media object at the time of the notification, and
enabling the user to cause the playing of the media object at a time different from the time of presentation of the notification.

2. The method of claim 1 in which presenting the notification includes displaying the notification.

3. The method of claim 1 in which presenting the notification includes vibrating the mobile device or playing a sound.

4. The method of claim 1 in which the notification includes interactive controls that can be invoked by the user.

5. The method of claim 1 in which the notification includes information that describes the media object.

6. The method of claim 1 including enabling the user to preselect a form of the notification to be presented.

7. The method of claim 1 including enabling the user to select a feature of the notification to be presented.

8. The method of claim 1 including enabling the user to select types of the media object for which the notification is presented.

9. The method of claim 1 in which presenting the notification includes indicating that the media object is not to be played until a time later than when it is first available.

10. The method of claim 1 in which presenting the notification includes indicating that the media object is not to be played after the expiration time.

11. The method of claim 1 in which presenting the notification includes incorporating other notifications related to other media objects at the same time.

12. The method of claim 1 in which the receiving of the media object at the mobile device occurs automatically without an action by the user.

13. The method of claim 1 also including enabling the user to select from a displayed list of available media objects a media object to be played.

14. The method of claim 1 in which presenting the notification includes presenting advertising to the user.

15. The method of claim 1 in which the notification is generated at the mobile device.

16. The method of claim 1 in which the notification is generated at the server.

17. The method of claim 1 in which the notification is presented through email.

18. The method of claim 1 in which the notification is presented through a text message.

19. The method of claim 1 in which the notification is embedded in another object being presented.

20. The method of claim 1 in which the notification is presented more than one time.

21. The method of claim 1 in which the notification is presented in combination with other notifications related to other media objects.

22. The method of claim 1 in which the notification is presented immediately after the media object has been received and stored.

23. The method of claim 1 in which presentation of the notification is delayed until several notifications are ready for presentation.

24. the method of claim 1 in which the media object has an expiration time and the time when the notification is presented is based on the expiration time.

25. The method of claim 24 in which the notification is presented when the expiration time is approaching or imminent.

26. The method of claim 1 in which the notification alerts the user about circumstances under which the media object can be presented.

27. The method of claim 1 in which the presentation of the notification causes a previously presented notification to disappear.

28. The method of claim 1 in which the notification presents information about the media object including at least one of the following: name, title, duration, source, time of availability, cost, advertising, and thumbnail image.

29. The method of claim 1 in which the notification presents devices that enable the user to take an action with respect to the notification.

30. The method of claim 1 in which the notification contains information about a time when the media object is allowed to be played.

31. The method of claim 1 in which the notification is presented with respect to a media object that is episodic.

* * * * *